P. E. DAUBENSPECK.
FASTENING DEVICE FOR TRACTION CHAINS.
APPLICATION FILED MAR. 9, 1920.

1,367,241.

Patented Feb. 1, 1921.

UNITED STATES PATENT OFFICE.

PETER E. DAUBENSPECK, OF BUTLER, PENNSYLVANIA.

FASTENING DEVICE FOR TRACTION-CHAINS.

1,367,241.  Specification of Letters Patent.  Patented Feb. 1, 1921.

Application filed March 9, 1920. Serial No. 364,421.

*To all whom it may concern:*

Be it known that I, PETER E. DAUBENSPECK, a citizen of the United States, residing at Butler, in the county of Butler and State of Pennsylvania, have invented new and useful Improvements in Fastening Devices for Traction-Chains, of which the following is a full, clear, and exact description.

The present invention relates broadly to traction chains of the floating type, and more particularly to a fastening device for connecting the ends of the side chains.

The principal object of the present invention is to provide a fastening device adapted under tractive influences to prevent accidental disengagement of the ends of the chains.

A further object of the present invention is to provide a fastening device of this nature comprising a main body member having openings formed therein at an angle adapted to receive one end of the chain and provided with means to prevent accidental disengagement of the chain therefrom.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1:
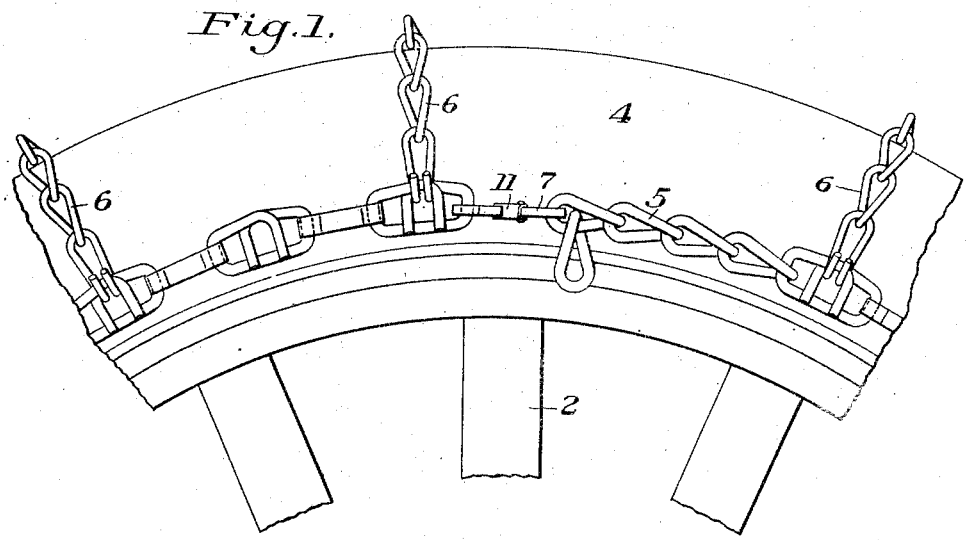
Figure 2:
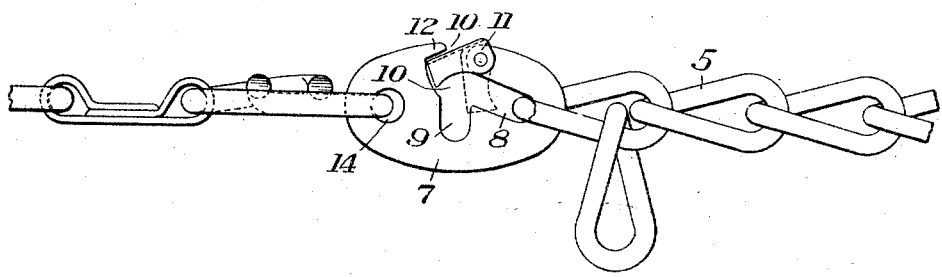

Figure 1 is a side elevation of a portion of a wheel having a floating chain applied thereto and secured by the use of an improved fastening device; and Fig. 2 is an enlarged detail view of the fastening device in position between the ends of one of the side chains.

It is well known to users of chains of the ordinary Weed type, that there is a tendency for the fastening device for the ends of the side chains to open and thereby permit accidental disengagement of the chain therefrom, unless the chains are applied with the fastening device extending in a predetermined direction.

Under the most favorable conditions, however, if the vehicle is driven backward, this operation will occur, due to the forcing of foreign material between the main body of the device and the pivoted guard. By the use of the present invention this tendency is entirely eliminated.

Referring more particularly to the drawings, there is illustrated a portion of a wheel 2 having a pneumatic or cushion tire 4 carried thereby to which is applied a grip tread preferably comprising side chains 5 and cross chains 6. This form of grip tread is ordinarily referred to as a floating chain, as it is adapted to creep around the wheel during operation of the vehicle to distribute the wear.

For securing the ends of each of the side chains 5 in proper position after the tread has been applied, I provide fastening devices comprising a main body 7 formed of suitable material and provided with slots or openings 8 and 9 extending at an angle to each other. The slots or openings 8 and 9 coincide or intersect to form a common opening 10 through one side of the body 7, which opening is adapted to be closed by pivoted guard 11 swingingly carried by the body 7 at one end and adapted to coöperate with a stop 12 at its other end. The device may be provided with a suitable opening 14 in which the end link of one end of the side chain may be secured.

In operation, the link to be detachably secured in the device is forced against the guard 11 causing the same to assume the dotted line position shown in Fig. 2. The link is pressed downwardly into the slot or opening 9 and the guard device is then swung to its full line position as illustrated in the drawings. The link may then be moved from the slot 9 into the slot 8. Due to the provision of intersecting slots or openings of the type disclosed, the guard device 11, whether in its open dotted line position or in its closed full line position, is adapted to prevent accidental disengagement of the chain from the device. At the same time, due to the provision of the stop 12, there is less of the outer surface of the guard 11 exposed than of the inner surface adjacent the slots 8 and 9. Due to this difference in the areas of the exposed surfaces on opposite sides of the guard, under tractive influences foreign material will have a greater tendency to maintain the guard in its closed position than to move the same to its open position. This feature is highly desirable, as the operation is positive whether the vehicle to which the device is applied is traveling in either a forward or a backward direction. At the same time, the device may be made comparatively small thereby accommodating the same for use with links of standard construction and permitting an accurate adjustment of the chains in position on the wheels.

The advantages of the present invention arise from the provision of a fastening device normally tending to prevent accidental disengagement of the free end of the chain under tractive influences, and which permits accurate adjustment of the chains on the wheel.

The particular form of side chain construction illustrated in the drawings is made the subject matter of my co-pending application Serial No. 364,787, filed March 10, 1920.

I claim:

1. A fastening device of the character described, comprising a body member having openings formed therein at an angle to each other, and a guard coöperating therewith for closing one of said openings when in closed position, and another of said openings when in open position, substantially as described.

2. A fastening device of the character described, comprising a body member having intersecting openings formed therein, and a guard pivotally coöperating therewith for closing one of said openings when in open position and another of said openings when in closed position, substantially as described.

3. A fastening device of the character described, comprising a body member having an opening through one side thereof, intersecting openings communicating with said first mentioned opening, and a guard coöperating therewith for closing said first mentioned opening when in closed position and one of said intersecting openings when in open position, substantially as described.

4. A fastening device of the character described, comprising a body member having an opening through one side thereof, a stop extending partially across said opening, and a guard pivotally carried by said body member and adapted to coöperate with the underside of said stop whereby the exposed outer area of said guard is lessened, said body member having angularly extending openings formed therein and communicating with said first mentioned opening, substantially as described.

5. A fastening device of the character described, comprising a body member having an opening extending substantially longitudinally thereof, a second opening extending substantially transversely thereof, said openings intersecting to form a common opening extending through one side of the body member, and means swinging inwardly within one of said openings for closing said last mentioned opening when in closed position, substantially as described.

6. A fastening device of the character described, comprising a body member having an opening extending substantially longitudinally thereof, a second opening extending substantially transversely thereof, said openings intersecting to form a common opening extending through one side of the body member, and means for closing said last mentioned opening, said means in its open position being adapted to close said first mentioned opening, substantially as described.

7. A fastening device of the character described, comprising a body member having intersecting openings formed therein at an angle to each other, and a guard device swinging inwardly into one of said openings in the body member to close the other of said openings at the point of intersection, substantially as described.

8. A fastening device of the character described, comprising a body member having chain receiving openings formed therein at an angle to each other, and a guard device swinging inwardly into one of said openings in the body member to close the other opening therein, substantially as described.

9. A fastening device of the character described, comprising a body member having openings formed therein at an angle to each other, a stop extending partly across one of said openings, and a guard coöperating with the underside of said stop and mounted to swing inwardly into another of said openings, substantially as described.

10. A fastening device of the character described, comprising a body member having intersecting chain receiving openings formed therein, a stop projecting partially across one of said openings, and a guard adapted to coöperate with the underside of said stop whereby the exposed outer area of the guard is less than the inner exposed area thereof, substantially as described.

In testimony whereof, I have hereunto set my hand.

PETER E. DAUBENSPECK.